Patented Oct. 23, 1928.

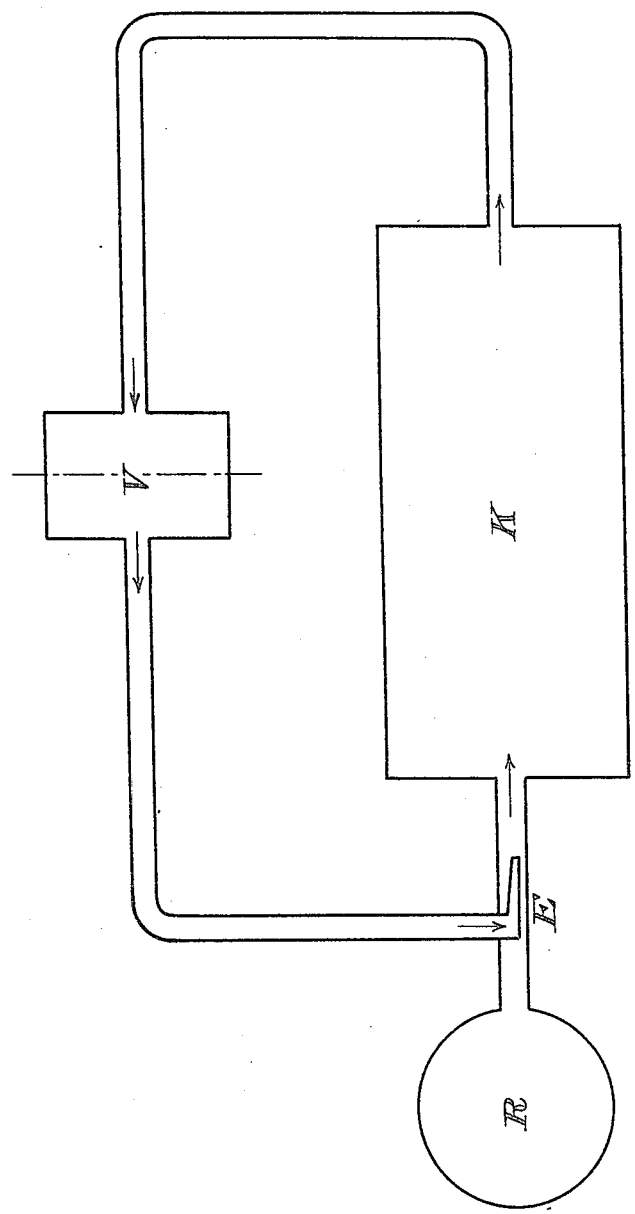

1,688,357

UNITED STATES PATENT OFFICE.

HANS SCHRADER, OF ESSEN-BREDENEY, AND HAROLD SCHOELLER, OF ESSEN, GERMANY.

SULPHUR OF A HIGH DEGREE OF DISPERSION AND PROCESS OF PREPARING SAME.

Application filed August 14, 1924, Serial No. 731,997, and in Germany August 16, 1923.

This invention relates to the preparation of sulphur of a high degree of dispersion.

Sulphur in finely divided or powdered form is required in many branches of industry, for instance, in agriculture for combatting fungi, especially in vineyards and in the rubber industry.

By the known methods of manufacture sulphur can be obtained in powdered form in two different ways. In one case mechanical means are employed, crystalline sulphur being ground and subjected to air flotation. In the other case the sulphur is obtained in fine state of subdivision by sublimation. Both methods produce finely subdivided sulphur, but it has been impossible to increase the degree of fineness by any further improvement or modification of these methods. There is also a so-called "precipitated sulphur" on the market which is produced by decomposing polysulphides. Its degree of dispersion is generally higher than that of the two previously mentioned products. However, owing to its considerably higher cost, it is not utilized to any appreciable extent in industry and agriculture. Industry and agriculture require large amounts of sulphur having the highest possible degree of subdivision at a cost which does not prohibit its use.

The product of the present invention fulfills this requirement. According to the process of the present invention sulphur vapors are dispersed during sublimation to an exceedingly fine fume by means of pure ammonia or ammonia diluted with another inert or non-oxidizing gas, such as nitrogen, and the resulting sulphur fume is separated from the dispersing gas as a powder having a high degree of dispersion.

In order more clearly to understand the invention, reference is made to the accompanying drawings which illustrate diagrammatically by way of example one form of apparatus suitable for carrying out the process.

The method of Fresenius and Beck see Zeitschrift für Analytische Chemie, vol. 42, page 21, (1903), is described as follows:

"We used the sulfurimeter of Johannes Greiver Fabrik für Präcisions-Glasinstrumente, in München. It was made according to the directions of Portele and consisted of a glass tube, of about 23 cm. in length, provided with a ground in glass stopper and a scale from 0 to 100. The length of the tube to the 100 mark was 175 mm., the length of the straight part of the tube from the 10 mark to the 100 mark was 154 mm., and the interior diameter of the tube was 12.68 mm.

"The sulfur powder to be tested was put through a 1 sq. mm. mesh sieve in order to break up the lumps which always form in sulfur on long standing. After sieving and mixing well 5 gr. were weighed out on a watch-glass to 0.1 mg. The sulfur was brought into the sulfurimeter with the aid of a sheet of cardboard and a brush. Then the apparatus was filled to about 1 cm. over the 100 mark with ether and strongly shaken for about one minute in order to thoroughly break up the sulfur. The apparatus is now again strongly shaken in a vertical position for exactly 30 seconds and then lowered in a vertical position into a beaker of water at 17.5° without touching either the walls, the bottom, or the thermometer. The sulfur settles to the bottom quite rapidly. When the height of the sulfur no longer changes and the overlying ether appears completely clear, the height of the sulfur is read on the scale (to one half a scale degree). The number thus read gives the degree Chancel directly."

Referring to the drawing, V is a fan which serves to circulate pure ammonia or ammonia diluted with another gas in a closed cycle in the direction indicated by the arrows. The gas is forced through the ejector E and passes as a strong current through the neck of the retort R. The sulphur vapors issuing from the retort R are dispersed by the gas current and simultaneously cooled, and the fume produced is caused to enter into the chamber K where the sulphur is separated out. This separation can be effected in a known manner, for example by simply allowing the sulphur to deposit or by electrical precipitation.

The degree of dispersion of the sulphur may be influenced by varying the relative quantities of the gas and the volatilized sulphur supplied to the ejector.

The sulphur produced by the present process as compared with the powered sulphur products hitherto on the market is distinguished by its high degree of dispersion and its considerably greater reactivity, said sulphur having a degree of dispersion which is far greater than that of the best flowers of sulphur or air-floated sulphur or even the precipitated sulphur.

Chancel's sulphurimeter is not capable, when using the usual amount of 5 grams, of determining its degree of dispersion. If, however, only 2 grams are used for determining the degree of dispersion according to the method of Fresenius and Beck, the dispersed sulphur produced according to the present process shows 70-90° Chancel as compared with the finest products hitherto on the market which show about 35° Chancel.

Claims:

1. Process for the production of sulphur of a high degree of dispersion which consists in dispersing sulphur vapors by means of a gas comprising ammonia, and separating the sulphur from the resulting fume.

2. Process for the production of sulphur of a high degree of dispersion as defined in claim 1, in which the degree of dispersion of the sulphur is determined by regulating the quantity of gas used in dispersing a unit quantity of sulphur vapors.

3. Process for the production of sulphur of a high degree of dispersion which consists in simultaneously cooling and dispersing sulphur vapors by means of a jet of a gas comprising ammonia, and thereafter collecting the finely divided sulphur.

In testimony whereof we affix our signatures.

Dr. HANS SCHRADER.
Dr. Ing. HAROLD SCHOELLER.